July 24, 1956 J. M. COLLINS 2,755,816
CHECK VALVES
Filed May 7, 1949
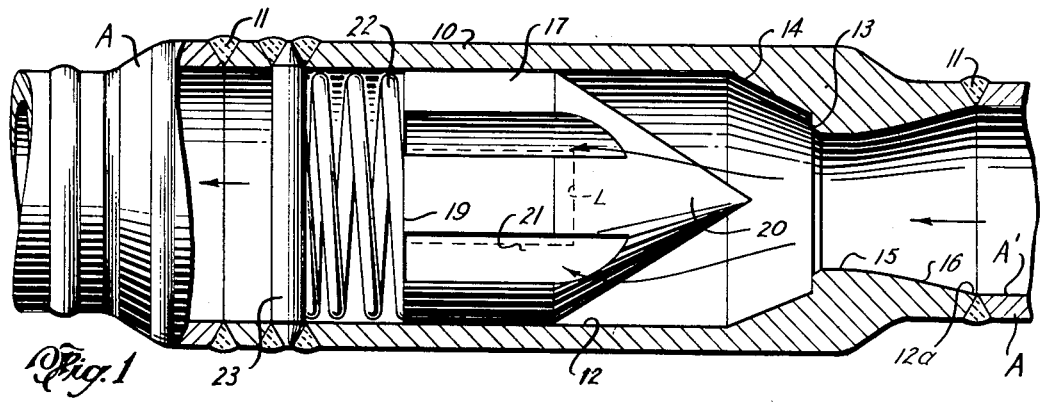
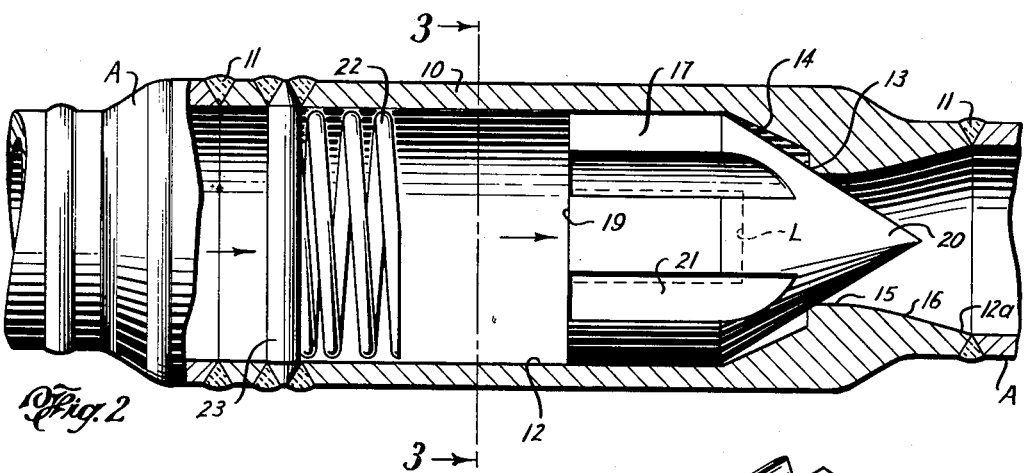
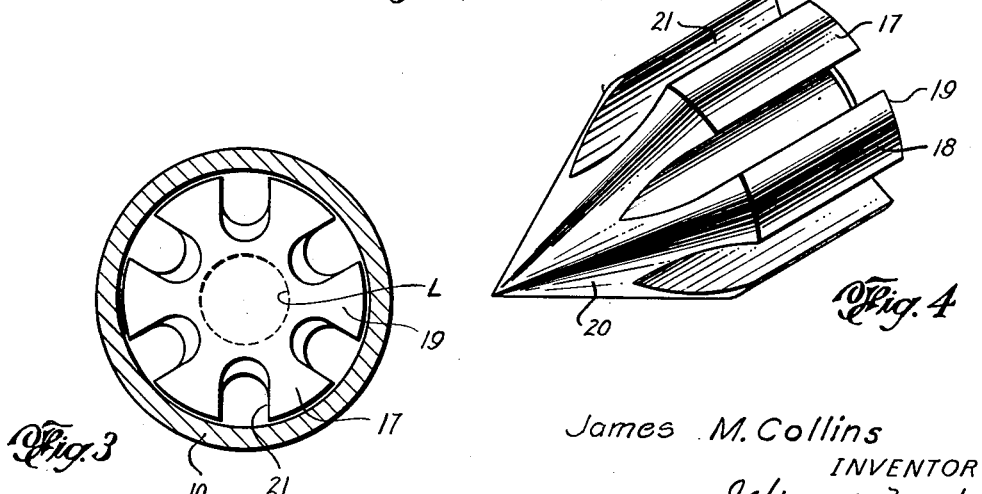
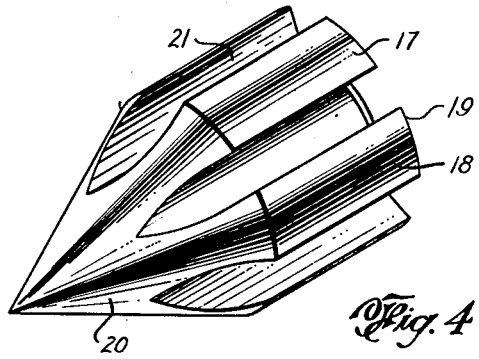
James M. Collins
INVENTOR
ATTORNEYS

United States Patent Office 2,755,816
Patented July 24, 1956

2,755,816

CHECK VALVES

James M. Collins, Sweeny, Tex., assignor to Collins Valve Company, Inc., Houston, Tex., a corporation of Texas Application May 7, 1949, Serial No. 92,033

2 Claims. (Cl. 137—496)

This invention relates to new and useful improvements in check valves.

One object of the invention is to provide an improved check valve which is particularly adapted for use in flow lines or conductors such as pipe lines and which is automatically actuated by the fluid flowing through the line or conductor, whereby in the event a break occurs in the upstream side of the line or for any reason a sudden drop in pressure takes place, said valve will be actuated to close the line against escape of fluid from the downstream side thereof.

An important object of the invention is to provide an improved check valve unit which is normally maintained in an open position by the pressure fluid flowing through the flow line or conductor and which is constructed so that the valve element of said unit does not appreciably interfere or restrict the normal flow through said line, whereby excessive wear due to contact with the flowing fluid is obviated with the result that said valve element may remain in the line for extended periods of time and yet be available for effective and positive operation as a check valve when needed.

Another object is to provide an improved check valve wherein the valve element is actuated by the differential in pressure across the valve and also wherein such operation by pressure differential is accomplished without subjecting the valve parts to excessive wear and battering and without appreciably interfering with or changing the "normal" pressure or volume of the fluid flowing through the conductor in which said valve is connected.

A further object is to provide a check valve unit wherein the flow orifices or passages in the valve element are so arranged that said orifices form substantially no restriction to the flow of fluid in the conductor in a "normal" direction but which, upon reverse flow of fluid, function as a restriction to set up a pressure differential across the valve element to move the element to a closed or shut-off position.

Still another object is to provide an improved check valve comprising only a single movable valve element which is so constructed that the entire valve unit may be made of a minimum size which facilitates manufacture and results in a saving in required material to minimize costs; said valve being so constructed that the single valve element will effect a positive closure of flow from the downstream side of a flow line system, whereby welding or other repair of the upstream side of the line can be made with complete safety and without having to depend solely upon the usual closure or block valve which may be subject to leakage when in a closed position.

Other and further objects of the invention will appear from the description of the invention.

In the accompanying drawings, which form a part of the instant specification, which are to be read in conjunction therewith and wherein like reference numerals are used to indicate like parts in the various views:

Figure 1 is a longitudinal sectional view of a check valve, constructed in accordance with the invention and illustrating the valve element in an open position, Figure 2 is a similar view, with the valve element in a closed position, Figure 3 is a transverse, sectional view, taken on the line 3—3 of Figure 2, and Figure 4 is an isometric view of the valve element.

In the drawings, the numeral 10 designates a tubular body which is adapted to be connected in a flow line or conductor A through which a pressure fluid is conducted. The body may be connected in any suitable manner and is illustrated as connected by means of a weld 11. The external diameter of the body 10 is slightly larger than the external diameter of the conductor and is formed with a longitudinal bore 12 which extends entirely through the body. At the inlet end 12a of the body an annular internal valve seat 13 is formed and this valve seat is preferably connected with the wall of the bore of the body through a tapered or flared annular surface 14. The valve seat has an axial inlet or passage 15 extending therethrough and this passage gradually tapers or inclines outwardly as indicated at 16 to the inlet end 12a of the bore of the body, it being preferable that this inlet end 12a be of the same diameter as the bore A′ of the flow conductor. The normal flow through the valve body 10 is in the direction of the arrows in Figure 1, said flow passing through the inlet 15 within the annular valve seat 13 and then flaring outwardly into the bore 12 of the body.

The particular cross-sectional area of the flow inlet 15 within the valve seat is less than the cross-sectional area of the bore of the conductor A so that a restriction is formed by the inlet. This restriction creates a slight pressure differential across the valve seat but the relationship of the area of the inlet to the area of the flow passage is such that this pressure differential is negligible so far as changing the pressure or volume which normally flows through the conductor A. In actual practice, it has been found that if the area of the inlet is approximately 80% of the area of the flow conductor, efficient operation will be had; however, the invention is not to be limited to this percentage since said inlet can be considerably less and the particular volume or pressure in the flow line A will determine the exact relationship between the area of said inlet and the area of the conductor. So long as the inlet 15 does not create a pressure differential which will appreciably change the normal pressure of the fluid flowing through the conductor the purposes of the invention will be accomplished.

In order to provide for a closure or a shutting off of flow through the line or conductor A in a reverse direction in the event that the upstream side of the line should break or the fluid pressure in said upstream side should fall below a predetermined point for any reason a valve element 17 is slidably mounted within the bore 12 of the body. The valve element is clearly shown in Figure 4 and comprises a cylindrical body portion 18 which has an external diameter slightly less than the diameter of the bore 12 whereby the valve element is freely movable within said bore. One end 19 of the valve element is flat while the opposite end 20 is conical or tapered to form a valve head, the particular angle of said taper being subject to some variation although it is preferable that it be along a relatively long or inclined slope. The conical head portion 20 of the valve is adapted to move into engagement with the valve seat 13 under certain conditions, as will be explained, and when in such position (Figure 2) a flow in the direction of the arrows in Figure 2 through the conductor and body will be prevented. A plurality of flow passages or channels 21 are formed in the external surface of the valve element and these passages extend throughout the cylindrical body portion and also throughout a portion of the conical valve head 20. The ends of the passages 21 terminate short of the end of the head 20 so that when the head is in seated position as shown in Figure 2, flow through the passages is prevented. Although the passages are illustrated as formed in the external surface of the valve element, such passages could be elongated drilled holes which extend longitudinally through the element.

The number of passages 21 as well as their individual sizes are subject to variation but the combined cross-sectional area of said passages bears a direct relationship to the cross-sectional area of the inlet 15 within the valve seat and also to the cross-sectional area of the flow conductor A. It is preferable that the combined cross-sectional area of the passages 21 be substantially equal to or greater than the cross-sectional area of the inlet 15, and it is also desirable that this combined cross-sectional area of the passages 21 equals 30% or more of the cross-sectional area of the conductor A. Thus, when a normal flow is occurring in the conductor and through the body in the direction of the arrows in Figure 1, a restriction of the flow from the conductor occurs at the inlet 15 but because the combined area of the passages 21 is equal to or greater than this inlet there is substantially no restriction across the valve element 17. It is noted that because the fluid passes into the bore of the slightly larger body after flowing through the inlet 15 and also because a portion of the fluid has its direction changed by its offsetting into the passages 21, there may be a slight pressure drop across the valve element but such drop will be negligible so far as causing any appreciable change in the normal pressure of the flowing fluid is concerned.

After the flow passes the inlet 15 there is no further restriction of the flow and the impact of the pressure of the flowing fluid is sufficient to maintain the valve in its open position. In such open position the valve abuts a shock absorbing spring 22 which is confined between the flat end 19 of the valve element 17 and a suitable stop such as a transverse pin 23 which extends across the interior of the valve body at one end thereof. It is noted that the spring 22 does not enter into the operation of the valve but merely functions as a shock absorber to absorb the impact when the valve is initially moved to an open position.

The combined cross-sectional area of the passages 21 in the valve element 17 must also bear a relationship to the over-all cross-sectional area of said element and must be less than said over-all cross-sectional area. With such arrangement when a reverse flow through the body occurs the passages 21 will immediately function as a restriction and will set up a pressure differential across the valve element 17, whereby the fluid acting against the larger flat end of the valve element will move said valve element to a closed position.

In the operation of the device the body 10 is connected in the flow line or conductor A at a desired point and the valve element 17 is loosely slidable within said body. When normal flow of the pressure fluid within the conductor occurs this pressure fluid will strike the tapered head 20 of the valve element and will move said valve element against the shock absorbing spring 22 to the position shown in Figure 1. In such position the valve is fully open and the flow of fluid from the conductor A is through the inlet 15 within the annular valve seat 13. As has been noted, the combined cross-sectional area of the passages 21 in the valve element is at least equal to or greater than the area of the inlet 15 with the result that after the flow passes the inlet 15 there is no further restriction of said flow. It has been noted that the size of the inlet 15, with respect to the area of the conductor A, is such that only a small pressure drop across the inlet will occur, and this means that there will be substantially little change in the normal flow pressure of the fluid in the line A. The fluid passing through the flow passages 21 of the valve element will continue through the conductor in a normal manner. Because the external diameter of the valve element is only slightly less than the bore 12 of the body 10 and also because the body portion 18 of the valve element is relatively long, there is no danger of the valve element becoming cocked or misaligned in the bore and thus a chattering or battering of the valve element is obviated. Any tendency for a battering of the element 17 in a longitudinal direction is eliminated by the shock absorbing spring 22.

After connection in the flow conductor the valve element will remain in its open position with substantially no interference with normal flowing operation so long as proper flow through the line is occurring. However, if a break should occur in the upstream side of the line A it would result in a sudden drop in the pressure in that side of the line and the pressure fluid in the downstream side of the line will immediately act upon the end surface 19 of the valve element 17. As has been pointed out the combined cross-sectional area of the passages 21 in the valve element is less than the remaining cross-sectional area of the body portion 18 of the valve and therefore the passages will definitely form a restriction to the flow when said flow is in the direction of the arrows in Figure 2. This restriction as set up by the passages 21 will create a pressure differential across the valve element 17, whereby the valve element is immediately moved to a seated position in engagement with the annular valve seat 13 to shut off a reverse flow through the body and through the conductor. It is obvious that by varying the combined cross-sectional area of the passages 21 with respect to the over-all cross-sectional area of the body portion 18 of the valve element, various differentials will be developed across the valve and the speed of closing of the valve may thereby be controlled. Actually any sudden drop in the upstream side of the conductor will result in an immediate reverse flow from the downstream side of the conductor and the impact of the pressure fluid against the flat end 19 will also enter into the rapid movement of the valve to a closed position. It is noted that although the passages 21 are illustrated as channels or grooves in the exterior surface of the element 17, such passages may take other forms, such as a plurality of longitudinal bores drilled through the body of the element.

From the foregoing, it will be seen that a very simple and efficient check valve is provided. The relationship of the various flow spaces and passages with respect to each other permits the valve element 17 to be held in its open position by the pressure fluid normally flowing through the conductor A. The element does not in any manner interfere with normal flow nor upset or change the volume or pressure of the fluid. Further, the construction is such that wear of the valve element is substantially eliminated since said element is not subjected to any battering or abrasive action, since it is positively guided within the bore 12 of the body, and its flow passages do not substantially restrict the normal flow after such flow has passed the inlet 15. It is, therefore, possible for the valve device to remain connected in an ordinary flow line or conductor for an indefinite period of time without danger of the valve element becoming damaged because of the flow which is constantly passing thereby. The valve element 17 is always in a condition to effectively shut off flow in the event that a break occurs in the upstream side of the conductor. Since the valve element is moved to its closed position by the pressure differential thereacross its operation is not only automatic but instantaneous. It is noted that by maintaining the various relationships between the flow passages 21, the inlet 15 and the cross-sectional area of the conductor A it is possible to provide a valve which can be manufactured of a minimum size so that the valve body is substantially the same size as the flow conductor. This results in being able to provide a lighter valve having less material which minimizes manufacturing costs.

It is, of course, evident that after the valve element 17 has been moved to a closed position, as shown in Figure 2, the difficulty in the upstream side of the conductor A may be repaired and upon flow being resumed the pressure fluid will act against that portion of the tapered head 20 within the inlet 15. At this time the upstream pressure is always greater than the downstream pressure since normal flow is in the direction of the arrows in Figure 1 and the valve element will be immediately and automatically moved to an unseated position upon the resumption of normal flow. Such normal flow will obviously maintain the valve in an an open position and reverse movement of the valve will not occur until such time as an excessive pressure drop might occur in the upstream side of the conductor.

It is pointed out that the valve body is only slightly larger than the flow line in which it is connected and the lower limit as to size of the body is determined by limitations as to the size of the inlet 15 and the area of the passages 21. As has been noted, the inlet 15 has an area with respect to the flow line which does not cause an appreciable pressure drop in the normal flowing pressure of the fluid in the line or conductor and therefore said inlet cannot be made too small; the passages 21 bear a relationship to the inlet and are at least equal to or greater than the inlet but at the same time the combined area of the passages must be less than the remaining area of the valve element. It therefore follows that in order for proper and efficient operation to be effected, the external diameter of the valve element has its limitations and in actual practice, it has been found that said element should be slightly larger than the inner diameter of the flow line which makes the valve body 10 slightly larger than the outer diameter of said line. It may be desirable, particularly in the larger sizes, to core or hollow out a portion of the valve element for the purpose of saving weight and such removal of material would be as indicated by the dotted line in Figure 2. Although the valve is illustrated as disposed and operating in a horizontal plane, it is obvious that it will operate in a vertical or angular position in the same manner.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described the invention, I claim:

1. A check valve including, a tubular body having an inlet end and an outlet end which are adapted to be connected to a flow conductor and also having an annular internal valve seat adjacent the inlet end of said body and connected with the wall of the bore of the body by a flared annular surface, the inlet through said seat having a cross-sectional area which is less than the cross-sectional area of the inlet end of said body which is connected with the flow conductor, and a valve element within the body actuated solely by the fluid flowing through the conductor movable with respect to the seat to a position disengaged from said seat to allow fluid flow in one direction through the body and conductor and also being movable to a position engaging said seat to close flow through the body and conductor in a reverse direction, the valve element comprising an elongate cylindrical member having one end tapered to a point and movable into the inlet of the valve seat and having its opposite end substantially flat, said valve element having a plurality of longitudinal flow passages therethrough extending from its flat end to points on the inclined surface of its tapered end, said flow passages being equal in their combined cross-sectional areas to the cross-sectional area of the inlet through the valve seat, the cross-sectional area of the inlet through the annular valve seat being eighty percent (80%) or less of the cross-sectional area of the flow conductor, and the combined cross-sectional areas of the flow passages through the valve element being at least thirty per cent (30%) of the cross-sectional area of said conductor.

2. A check valve including, a tubular body having an inlet end and an outlet end which are adapted to be connected to a flow conductor and also having an annular internal valve seat adjacent the inlet end of said body and connected with the wall of the bore of the body by a flared annular surface, the inlet through said seat having a cross-sectional area which is less than the cross-sectional area of the inlet end of said body which is connected with the flow conductor, and a valve element within the body actuated solely by the fluid flowing through the conductor movable with respect to the seat to a position disengaged from said seat to allow fluid flow in one direction through the body and conductor and also being movable to a position engaging said seat to close flow through the body and conductor in a reverse direction, the valve element comprising an elongate cylindrical member having one end tapered to a point and movable into the inlet of the valve seat and having its opposite end substantially flat, said valve element having a plurality of longitudinal flow passages therethrough extending from its flat end to points on the inclined surface of its tapered end, said flow passages being equal in their combined cross-sectional areas to the cross-sectional area of the inlet through the valve seat, the cross-sectional area of the inlet through the annular valve being eighty percent (80%) or less of the cross-sectional area of the flow conductor, and the combined cross-sectional areas of the flow passages through the valve element being at least thirty percent (30%) of the cross-sectional area of said conductor, said combined cross-sectional areas of the flow passages through said valve element also being less than the remaining cross-sectional area of said valve element.

References Cited in the file of this patent

UNITED STATES PATENTS

| | | |
|---|---|---|
| 681,681 | Collewine | Sept. 3, 1901 |
| 936,415 | Congdon | Oct. 12, 1909 |
| 1,443,675 | Bowler | Jan. 10, 1923 |
| 1,851,926 | Butler | Mar. 29, 1932 |
| 1,873,782 | Nixon | Aug. 23, 1932 |
| 1,930,839 | Kater | Oct. 17, 1933 |
| 2,206,356 | Hutchings | July 2, 1940 |
| 2,244,212 | Patton | June 3, 1941 |